United States Patent
Meijer et al.

(10) Patent No.: US 7,797,453 B2
(45) Date of Patent: Sep. 14, 2010

(54) RESOURCE STANDARDIZATION IN AN OFF-PREMISE ENVIRONMENT

(75) Inventors: Henricus Johannes Maria Meijer, Mercer Island, WA (US); Thomas F. Bergstraesser, Kirkland, WA (US); Christopher W. Brumme, Mercer Island, WA (US); Lili Cheng, Bellevue, WA (US); Alexander G. Gounares, Kirkland, WA (US); James R. Larus, Mercer Island, WA (US); Debi P. Mishra, Bellevue, WA (US); Ira L. Snyder, Jr., Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 657 days.

(21) Appl. No.: 11/613,342

(22) Filed: Dec. 20, 2006

(65) Prior Publication Data
US 2008/0082601 A1   Apr. 3, 2008

Related U.S. Application Data

(63) Continuation-in-part of application No. 11/536,890, filed on Sep. 29, 2006.

(51) Int. Cl.
*G06F 15/16* (2006.01)
(52) U.S. Cl. ............ 709/246; 709/201; 709/205; 709/224; 709/208; 709/219; 709/203; 709/206; 705/26; 705/2; 705/3; 705/52; 370/252; 370/465
(58) Field of Classification Search .......... 709/246, 709/205, 203, 201, 224, 208, 219, 206; 705/35, 705/40, 37
See application file for complete search history.

(56) References Cited

U.S. PATENT DOCUMENTS

| | | | |
|---|---|---|---|
| 5,263,165 A | 11/1993 | Janis | |
| 5,495,576 A | 2/1996 | Ritchey | |
| 5,537,404 A | 7/1996 | Bentley et al. | |
| 5,588,914 A | 12/1996 | Adamczyk | |
| 5,859,972 A | 1/1999 | Subramaniam et al. | |
| 6,064,656 A | 5/2000 | Angal et al. | |
| 6,085,186 A | 7/2000 | Christianson et al. | |

(Continued)

FOREIGN PATENT DOCUMENTS

EP  09155595  5/1999

(Continued)

OTHER PUBLICATIONS

Brunner, et al. "Disruption Tolerant Networking" Dagstuhl Seminar Proceedings (2005) NEC Europe Ltd., Network Labooratories, 4 pages.

(Continued)

*Primary Examiner*—Jude J Jean Gilles
(74) *Attorney, Agent, or Firm*—Lee & Hayes, PLLC

(57) ABSTRACT

A computing paradigm where information can be aggregated from multiple services/programs within a 'cloud-based' environment is provided. Thus, the system can provide a uniform interface that can combine computational tasks across the multiple services/programs. Thus, the innovation takes advantage of the computing device being a 'thin client' which affords greater user comfort to a user without sacrificing data processing capabilities. Accordingly, the mechanisms are disclosed that standardize and/or normalize data across the resources within the cloud.

16 Claims, 10 Drawing Sheets

U.S. PATENT DOCUMENTS

| | | | |
|---|---|---|---|
| 6,102,969 | A | 8/2000 | Christianson et al. |
| 6,185,567 | B1 | 2/2001 | Ratnaraj et al. |
| 6,209,039 | B1 | 3/2001 | Albright et al. |
| 6,226,260 | B1 | 5/2001 | McDysan |
| 6,341,127 | B1 | 1/2002 | Katsube et al. |
| 6,195,683 | B1 | 2/2002 | Palmer et al. |
| 6,409,599 | B1 | 6/2002 | Sprout et al. |
| 6,415,288 | B1 | 7/2002 | Gebauer |
| 6,434,532 | B2 | 8/2002 | Goldband et al. |
| 6,469,991 | B1 | 10/2002 | Chuah |
| 6,496,482 | B1 | 12/2002 | Kubota |
| 6,620,043 | B1 | 9/2003 | Haseltine et al. |
| 6,707,820 | B1 | 3/2004 | Arndt et al. |
| 6,745,224 | B1 | 6/2004 | D'Souza et al. |
| 6,917,975 | B2 | 7/2005 | Griffin et al. |
| 6,961,318 | B2 | 11/2005 | Fichou et al. |
| 7,002,926 | B1 | 2/2006 | Eneboe et al. |
| 7,020,654 | B1 | 3/2006 | Najmi |
| 7,065,041 | B2 | 6/2006 | Sen |
| 7,373,377 | B2 | 5/2008 | Altieri |
| 2002/0124053 | A1 | 9/2002 | Adams et al. |
| 2003/0005455 | A1 | 1/2003 | Bowers |
| 2003/0105734 | A1 | 6/2003 | Hitchen et al. |
| 2003/0229623 | A1 | 12/2003 | Chang et al. |
| 2004/0049537 | A1 | 3/2004 | Titmuss |
| 2004/0076160 | A1 | 4/2004 | Phaltankar |
| 2004/0098456 | A1 | 5/2004 | Kryzanowski et al. |
| 2004/0236646 | A1* | 11/2004 | Wu et al. ............... 705/30 |
| 2005/0033669 | A1 | 2/2005 | Stremler et al. |
| 2005/0044197 | A1* | 2/2005 | Lai ............... 709/223 |
| 2005/0138419 | A1 | 6/2005 | Gupta et al. |
| 2005/0238024 | A1 | 10/2005 | Taylor et al. |
| 2005/0262132 | A1 | 11/2005 | Morita et al. |
| 2005/0289234 | A1 | 12/2005 | Dai et al. |
| 2006/0020700 | A1 | 1/2006 | Qiu et al. |
| 2006/0031518 | A1 | 2/2006 | Jennings |
| 2006/0036904 | A1 | 2/2006 | Yang |
| 2006/0041606 | A1 | 2/2006 | Sawdon |
| 2006/0048224 | A1 | 3/2006 | Duncan et al. |
| 2006/0062161 | A1 | 3/2006 | Tang et al. |
| 2006/0069726 | A1 | 3/2006 | McKibben et al. |
| 2006/0123005 | A1 | 6/2006 | Burnett et al. |
| 2007/0059706 | A1 | 3/2007 | Yu et al. |
| 2007/0115123 | A1 | 5/2007 | Roberts et al. |
| 2007/0136572 | A1 | 6/2007 | Chen et al. |
| 2008/0027850 | A1* | 1/2008 | Brittan et al. ............... 705/37 |

FOREIGN PATENT DOCUMENTS

| | | |
|---|---|---|
| EP | 1058429 A1 | 12/2000 |
| EP | 1376309 A2 | 1/2004 |
| EP | 1524580 A2 | 4/2005 |
| EP | 1564622 A2 | 8/2005 |
| JP | 2001282634 A | 10/2001 |
| KR | 1020040038271 A1 | 5/2004 |
| KR | 1020040107152 A1 | 12/2004 |
| KR | 1020060057563 | 5/2006 |
| WO | WO04/002107 | 12/2003 |
| WO | 2005022826 | 3/2005 |

OTHER PUBLICATIONS

Fox, et al. "Towards Flexible Messaging for SOAP Based Services" (2004) IEEE, 11 pages.

Gunduz, et al. "A Framework for Aggregating Network Performance in Distributed Brokering Systems" (2000) Deptartment of Electrical Engineering & Computer Science, Syracuse University, 11 pages.

Chekuri, et al. "Building Edge-Failure Resilient Networks" (2002) Lucent Bell Labs, 18 pages.

Hota, et al. "Restoration of Virtual Private Networks with QoS Guarantees in the Pipe Model" (2004) GESTS International Transaction on Computer Science and Engineering, vol. 6 and No. 1, Journal ISSN No. 1738-6438, 12 pages.

Brightwell, et al. "Reserving Resilient Capacity in a Network" (2003) Networks 41, No. 2, 20 pages.

Duffield, et al. "A Flexible Model for Resource Management in Virtual Private Networks" (1999) ACM SIGCOMM Computer Communication Review vol. 29, Issue 4, 14 pages.

Create Buzz Marketing & Word of Mouth Marketing Campaigns. 2004-2005 Buzzoodle, A Liquid Learning Inc. Company. http://www.buzzoodle.com. Last accessed Sep. 20, 2006.

Seth Godin. Unleashing the Ideavirus. Do You Zoom, Inc., 2000.

James Surowiecki. The Wisdom of Crowds. Doubleday, 2004.

Sandhu, et al. Access Control: Principles and Practice. IEEE Communications Magazine, Sep. 1994.

System Management Concepts: Operating System and Devices, http://www.dlib.indiana.edu/doc_link/en_US/a_doc_lib/aixbman/admnconc/audit.htm. Last accessed Sep. 20, 2006.

Hughes, et al. Automated Verification of Access Control Policies. http://www.cs.ucsb.edu/~bultan/publications/tech-report04.pdf. Last accessed Sep. 20, 2006.

Cederquist, et al. An Audit Logic for Accountability. 2005. http://www.citebase.org/fulltext?format=application/pdf&identifier=oai:arXiv.org:cs/0502091. Last accessed Sep. 20, 2006.

* cited by examiner

RESOURCE STANDARDIZATION IN AN OFF-PREMISE ENVIRONMENT

CROSS REFERENCE TO RELATED APPLICATIONS

This application is a continuation in part of U.S. patent application Ser. No. 11/536,890, filed on Sep. 29, 2006, and entitled DATA NORMALIZATION, the entirety of which is incorporated herein by reference.

BACKGROUND

Conventionally, most computational tasks are undertaken upon a client or within a proprietary intranet. For instance, through utilization of a software application resident upon the client, data is created, manipulated, and saved upon a hard drive of the client or on an on-site server. Most often, data is saved local to the client.

Client-side operating systems are employed to manage relationships between users, software applications, and hardware within a client machine, as well as data that is resident upon a connected intranet. The conventional computing paradigm is beginning to shift, however, as maintaining security, indexing data, and the like on each client device can be quite expensive. As network connectivity has continued to improve, it has become apparent that a more efficient computing model includes lightweight (e.g., inexpensive) clients that continuously communicate with third-party computing devices to achieve substantially similar end results when compared to the conventional computing paradigm. In accordance with this architecture, the third-party can provide a 'cloud' of devices and services, such that requests by several clients can simultaneously be serviced within the cloud without the user noticing any degradation in computing performance.

Conventionally, computational tasks executed by a client are carried out by employing subscription services and/or programs specifically designed for each separate task. In many instances, these tasks are all related to one broad subject area, yet a user is often inconvenienced with the burden of employing separate subscription services and/or programs for each narrow task. As well, many (or most) services operate according to programming languages/protocols that are tailored to their specific purpose which makes achieving uniformity across disparate sources difficult. As more routine tasks continue to be carried out by business and personal computers, combination of computational tasks has continues to become inefficient. This drawback can be propagated through all types of software applications and data associated therewith resident within the 'cloud.'

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

As described above, in traditional systems, computational tasks executed by a client are most often performed by task-specific subscription services, applications and/or programs. In many instances, these tasks are all related to one broad subject area, however, a large burden exists in the need to utilize separate subscription services, applications and/or programs for each specific task. Moreover, many services require specific programming languages/protocols that are tailored to their specific purpose which makes achieving uniformity across disparate sources difficult. As more routine tasks continue to be carried out by business and personal computers, it can be particularly useful to establish an efficient way of combining computational tasks and the resources associated therewith.

The subject innovation, in one aspect thereof discloses a computing paradigm where information can be aggregated from multiple services/programs. Thus, the system can provide a uniform interface to combine computational tasks across the multiple services/programs. In one aspect, the process takes place through a third party service or 'cloud' that integrates the various protocols across the multiple services/programs. This integration can address both the semantics as well as the structure of the data.

Utilizing a 'cloud-based' computing environment mitigates the need to perform a vast amount of data processing at the client level. However, inconsistency of data (e.g., formats, protocols) prohibits the taking of the full advantage of the 'cloud-based' aggregation of resources. Thus, the subject innovation takes advantage of the computing device being a 'thin client' which affords greater comfort to a user without sacrificing data processing capabilities. Accordingly, the subject innovation discloses mechanisms that standardize and/or normalize data across the resources within the cloud taking into account both semantics as well as structure of the data.

Moreover, the user of a client computer can employ a macro or any other type of user-defined function that receives data from the third party service relating to the multiple programs or subscription services. The system can 'normalize' the data thus providing compatibility across resources. Accordingly, the data can be subsequently processed and displayed according to the user's desire.

In yet another aspect thereof, an artificial intelligence (AI) and/or machine learning and reasoning (MLR) component is provided that employs a probabilistic and/or statistical-based analysis to prognose or infer an action that a user desires to be automatically performed. For example, AI and MLR mechanisms can be employed to determine a format by which to standardize as well as to determine when standardization is desired. For instance, the system can infer when data will be used across resources and therefore automatically prompt standardization and/or compatibility.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
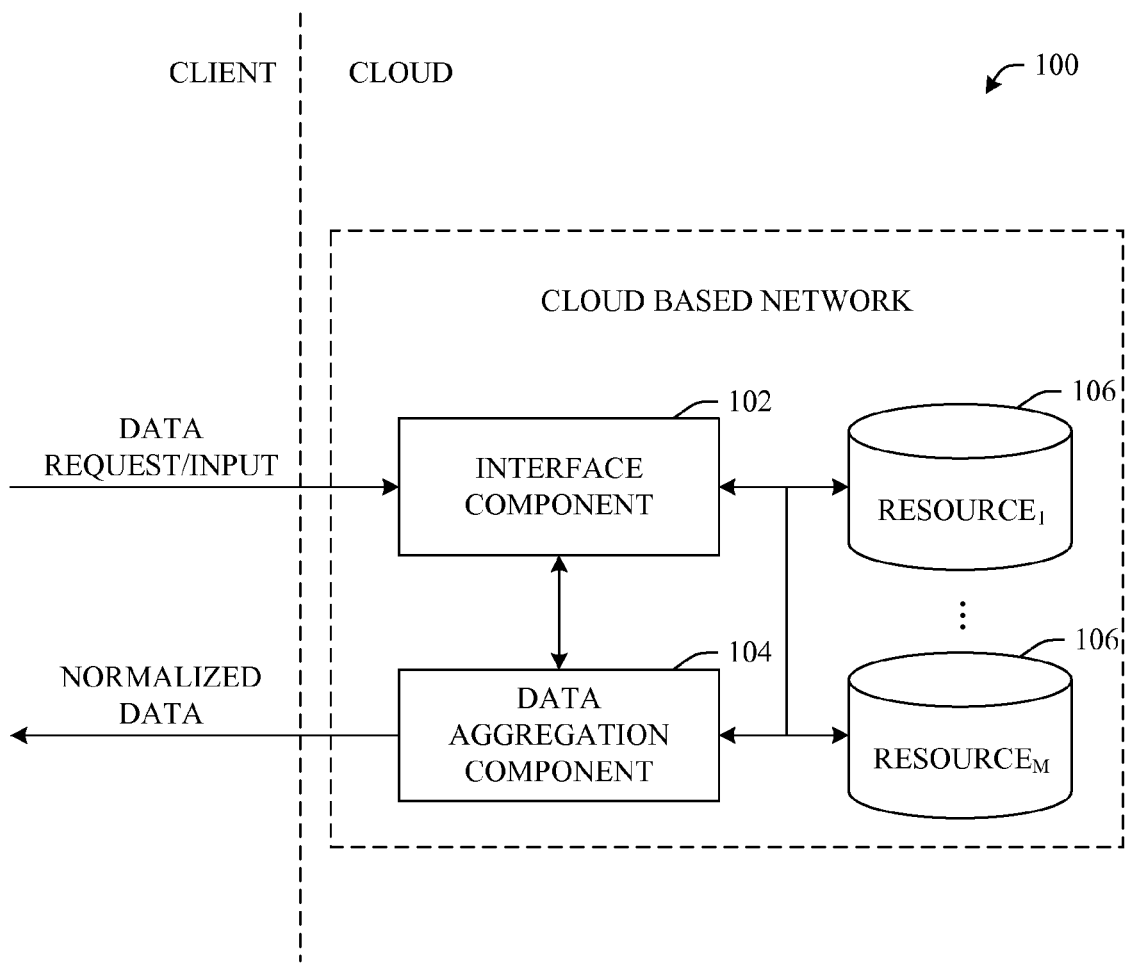
FIG. 1 illustrates a 'cloud-based' system that facilitates data aggregation in accordance with an aspect of the innovation.

The following terms are used throughout the description, the definitions of which are provided herein to assist in understanding various aspects of the subject innovation. It is to be understood that this definition is not intended to limit the scope of the disclosure and claims appended hereto in any way. As used herein, a 'cloud' can refer to a collection of resources (e.g., hardware, data and/or software) provided and maintained by an off-site party (e.g., third party), wherein the collection of resources can be accessed by an identified user over a network. The resources can include data storage services, word processing services, and many other information technological services that are conventionally associated with personal computers or local servers.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the drawings, FIG. 1 illustrates a system 100 that facilitates data concurrency and/or consistency across resources maintained 'off-premise,' for example, within the 'cloud.' As used herein and stated above, a 'cloud' refers to a collection of data and resources (e.g., hardware, data and/or software) provided and maintained by an off-site or off-premise party (e.g., third party), wherein the collection of data and resources can be accessed by an identified user via a network. The resources can include data storage services, data processing services (e.g., applications), and many other services that are conventionally associated with and resident within personal computers or local or 'on-premise' servers.

In other words, the innovation enables data to be cross-compatible between resources within a 'cloud' environment where the cross-compatibility can be based upon available resources. Unlike today's systems where applications and services require specific data formats, the subject specification discloses cloud-based systems and mechanisms by which data can be shared between resources. In one example, this cross-compatibility or concurrency can enable a user to utilize preferred resources based upon a preference, context, task, activity, license right, etc. without the burden of incompatibility or requirement to use multiple resources.

Generally, the system 100 can include an interface component 102 that provides a gateway between a user and a plurality of 'cloud-based' resources. As well, the system 100 includes a data aggregation component 104 that can receive, obtain or otherwise access data from a number of resources. Subsequently, the data aggregation component 104 can normalize the data into a common format. It is to be understood that 'normalizing' data into a common format as described herein can refer to both standardizing semantics of data as well as shape of data.

In other words, in one aspect, the data aggregation component can standardize the data into a format recognizable and/or compatible with a number of resources. In another aspect, the data aggregation component 104 can choose a single resource and normalize all of the data in accordance with the selected resource. As shown in FIG. 1, the interface component 102 and data aggregation component 104 can communicate with 1 to M resources. As illustrated, the 1 to M resources can be referred to collectively or individually as resources 106.

For example, rather than requiring a particular service to be compatible with a variety of data types, the subject innovation can standardize (e.g., normalize) data into a common format compatible with the service. By way of more specific example, the system can provide for a variety of information related to mapping applications to be normalized such that information can be superimposed over other information. This can be useful in the area of real estate sales where plat maps of a different format can be normalized and superimposed over a bitmap of a particular piece of property or structure. Other exemplary uses for the innovation can be fantasy sports, email management, stock/financial management, tax preparation, etc. It is to be understood that these examples are provided to add perspective to the innovation and are not intended to limit the subject matter and/or scope in any way.

As described above, in one aspect, the subject innovation alleviates the need to employ multiple resources to view and/or manipulate a general category of data. In one example, the subject innovation can be employed to view and/manipulate email from a number of disparate email accounts. For instance, in accordance with traditional systems, a user would have to proactively set up POP (post office protocol) and SMTP (simple mail transfer protocol) rules in order to retrieve and send email associated to multiple accounts from a single location. In accordance with the subject innovation, because both the data and the services (e.g., resources 106) can be maintained remotely from the user/client, e.g., within the 'cloud', the subject system 100 can automatically normalize data in accordance with any preference, policy, rule, etc. imposed either by the user, system administrator, application or otherwise.

Most services operate according to specific programming languages, protocols and formats that are tailored to their specific purpose and which make achieving uniformity across disparate sources extremely difficult and therefore, expensive. As more routine tasks continue to be carried out by business and personal computers, the subject innovation can provide a more efficient way of combining computational tasks and data associated therewith. In other words, the data aggregation component 104 can be employed to standardize data and/or computational elements (e.g., files, languages, macros, user-defined functions, code . . . ) in such a way that this standardized data can be cross compatible to multiple resources 106 without intervention by a user.

In accordance with the innovation, a client computer can employ a process that aggregates information from and associated with multiple services/programs (e.g., resources 106) and provides a uniform interface to combine computational tasks across the multiple services/programs. In one aspect, the process takes place through a third party service or 'cloud' that integrates the various protocols across the multiple services/programs. Utilizing a 'cloud' mitigates the need to perform a vast amount of data processing at the client level. Therefore, in a 'cloud environment', the subject specification allows for a user's device to be a 'thin client' which affords greater user comfort without sacrificing data processing capabilities.

Moreover, in aspects, the user of a client device can employ a macro or any other type of user-defined function that receives standardized and/or normalized data from the third party service (e.g., 'cloud' resource 106) that relates to the multiple programs or subscription services. The normalized data can be subsequently processed and/or displayed according to the user's desire or preferences.

Figure 2:
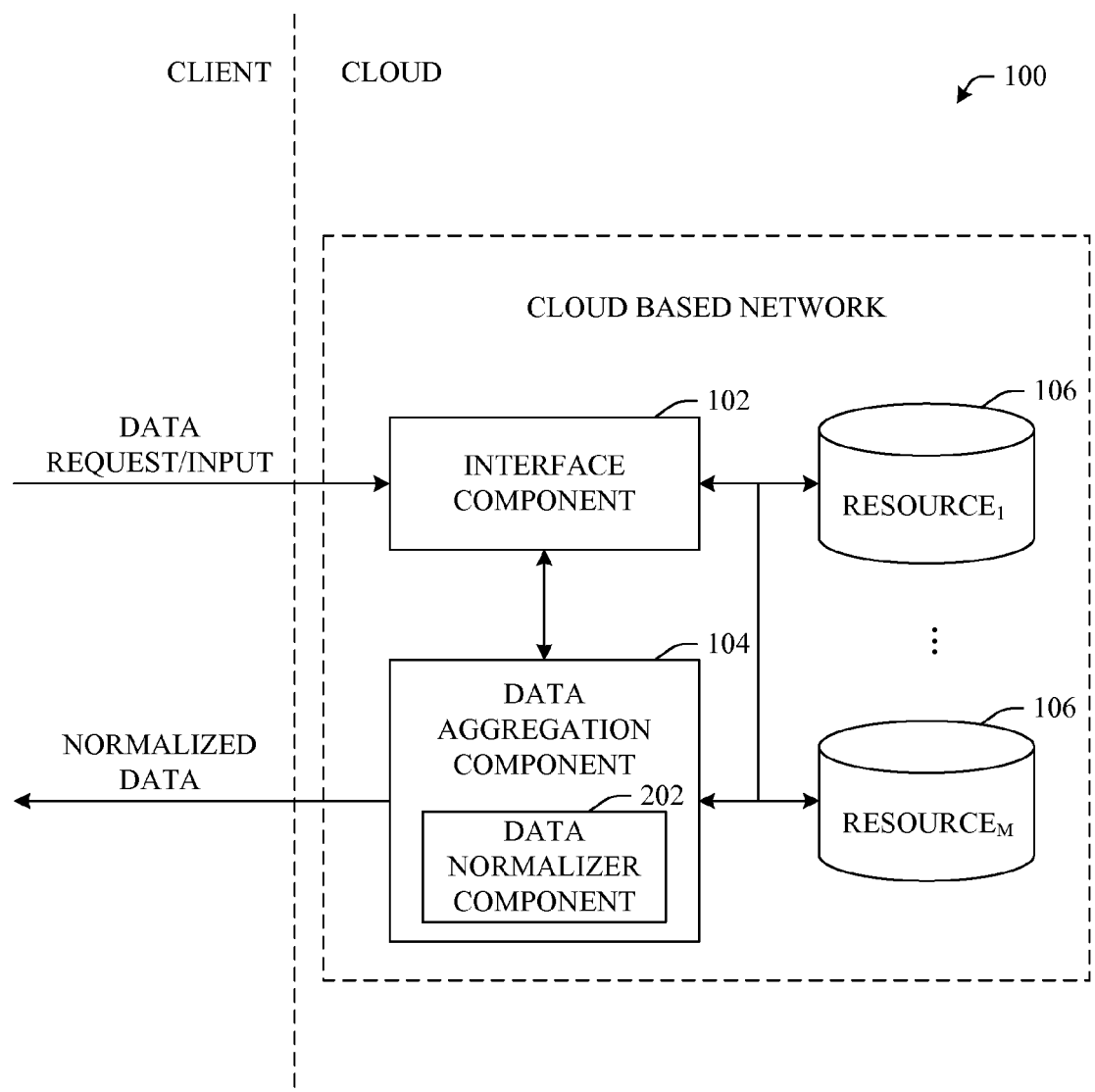
FIG. 2 illustrates a data aggregation system that employs a normalizer component in accordance with an aspect of the innovation.

Referring now to FIG. 2, an alternative block diagram of system 100 is shown. More particularly, as illustrated in FIG. 2, the data aggregation component 104 can include a data normalizer component 202. The data normalizer component 202 can be employed to convert data that corresponds to a number of resources into a standard or common format.

In one aspect, the data normalizer component 202 can convert the data from various resources 106 into a format consistent with a single resource 106. As will be described in greater detail below, this single resource 106 can be determined based upon a preference, a predefined rule or hierarchy and/or inferred based upon a context and/or user identity. In this aspect, once converted, the data can be utilized by the selected 'cloud-based' resource.

In another aspect, the data normalizer component 202 can convert the data into a format that can be understood by multiple resources 106. For instance, in the case of word processing files, the data normalizer component 202 can convert the files into an ASCII format (American standard code for information interchange) and/or RTF (rich text format) which applies a standard set of numerical values to the letters of the alphabet, numbers as well as punctuation and other characters. It is to be understood that this word processing format represents a simplistic example of data normalization. Accordingly, the data normalizer component 202 can be employed to convert most any data type into a format comprehendible by disparate 'cloud-based' resources.

In another example, as shown in FIG. 2, normalized data can be returned from the 'cloud' environment. This normalized data can be rendered to a user via a display or input into a client based resource or application for further processing. In all, it is to be understood that the normalized data can be employed in connection with resources located within the 'cloud' (e.g., 106) or within the client's environment (not shown).

Additionally, the innovation described herein contemplates that there can be many different data formats available. Thus, it is understood that, as formats emerge, a closed system may be difficult to achieve. With this in mind, it is to be appreciated that the subject data normalization component 202 can be pluggable to enable normalization of most any arbitrary format into a common format. Similarly, the pluggable functionality of the data normalization component 202 also enables most any common format to be de-normalized into any desired target format. In other words, the data normalization component 202 enables injection of domain-specific knowledge into the normalization process at each stage (e.g., receiving, analyzing, retrieving, normalizing).

Figure 3:
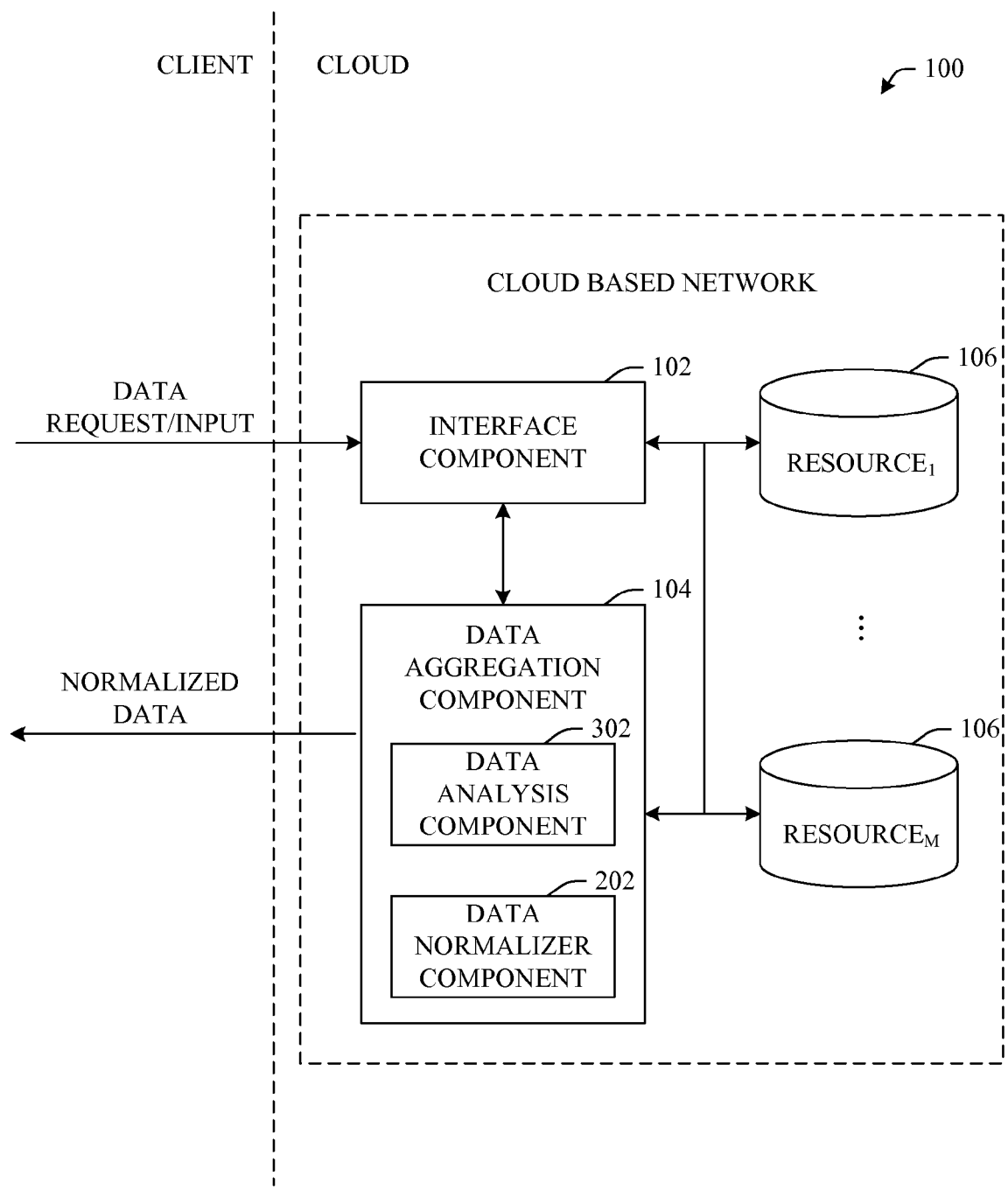
FIG. 3 illustrates a system that employs a data analysis component in accordance with an aspect of the innovation.

Turning now to FIG. 3, still another alternative block diagram of system 100 is shown. In particular, data aggregation component 104 can include a data analysis component 302 in addition to the data normalizer component 202. The data analysis component 302 can analyze data associated with multiple resources 106 thereafter instructing the data normalizer component 202 of an appropriate file type and/or format to employ with regard to standardization.

The data analysis component 302 can analyze the data compiled by the data aggregation component 104 related to the resources 106. As shown, this data can be gathered from resources 106 in connection with each particular service/application. In other aspects, data can be gathered from other sources within (or outside of) the cloud. These additional aspects are to be included within the scope of this disclosure and claims appended hereto.

In operation, the data analyzer component 302 can determine a particular target data type and thereafter instruct the data normalizer component 202 accordingly. This data type can be determined based upon a cost analysis, a compatibility analysis, a user preference, a user context, device profile, etc. For example, in one aspect, the data analysis component 302 can consider the profile and capabilities of a device employed by a client/user.

In doing so, the processing power, memory storage capacity, display capabilities, etc. can be considered when normalizing the data. By way of further example, in the event that the display is limited in graphical capabilities, the data analysis component 302 can determine a format that does not require extensive graphics capabilities for effective rendering. Still further, other aspects enable data to marked or tagged to prohibit normalization. It will be understood that this marking/tagging can be based upon most any criteria including user preference, policy, content, confidential nature, etc.

Moreover, other aspects of the innovation enable normalization be regulated based upon identity. For instance, normalization can be subject to identity based authentication and/or authorization techniques and/or mechanisms. These authentication and authorization mechanisms enable normalization to be blocked. For instance, if a user did not want their 'off-premise' data to be subject to global normalization, the subject innovation enables access control lists and other regulatory mechanisms to be used to restrict normalization. It will be understood that this restricted normalization can enable users to control who can access there data thereby creating marketing opportunities for sharing data.

Figure 4:
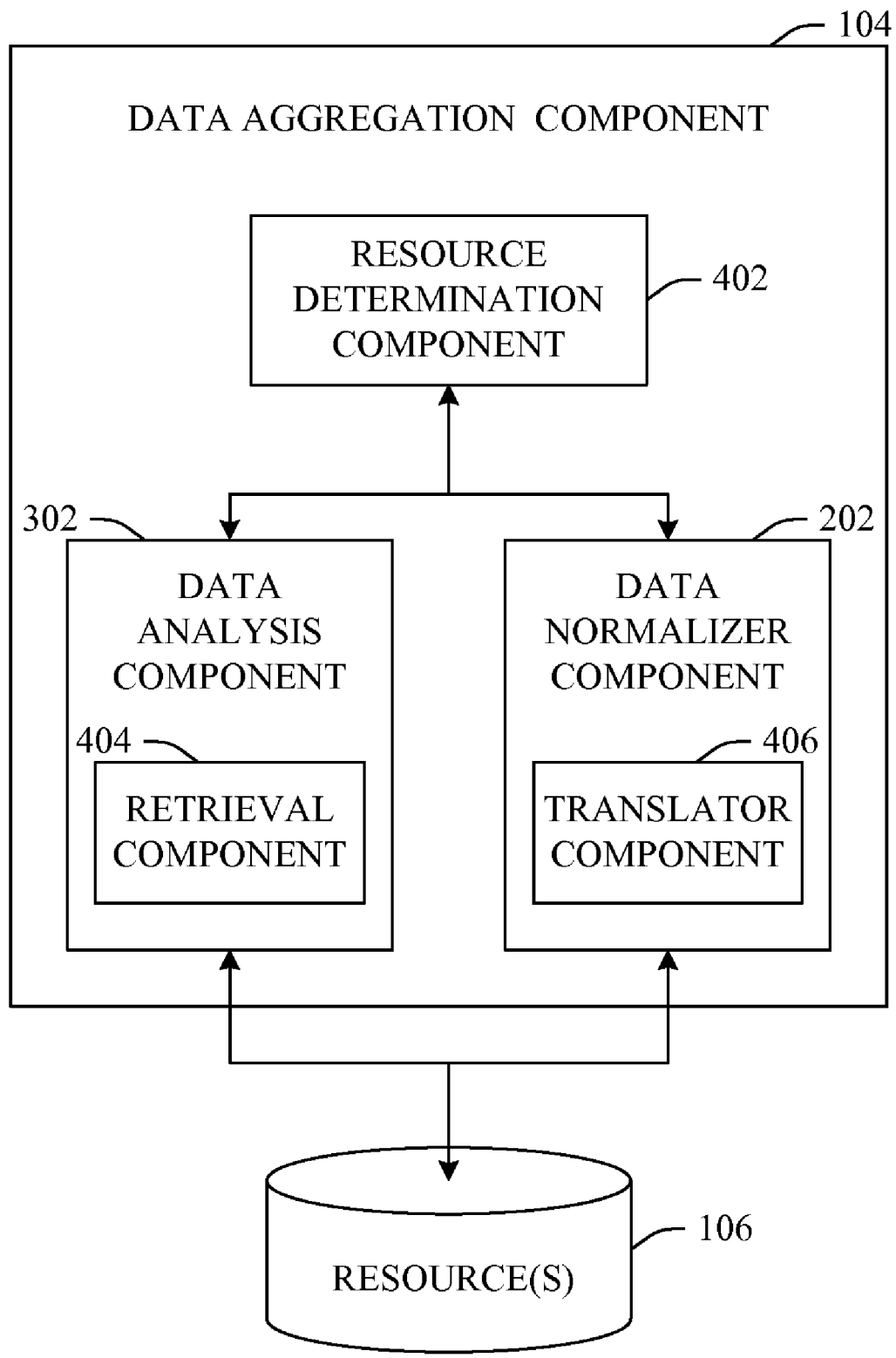
FIG. 4 illustrates a system that can automatically retrieve data and translate the retrieved data in accordance with an aspect of the innovation.

FIG. 4 illustrates an alternative block diagram of a data aggregation component 104 in accordance with an aspect of the innovation. More particularly, the data aggregation component 104 of FIG. 4 illustrates a resource determination component 402 that can identify applicable resources 106 that relate to the type(s) of data requested. For instance, suppose a user desires to view email, in this scenario, the resource determination component 402 can identify all of the 'cloud-based' resources 106 that correspond with this type(s) of data. Moreover, as will be described infra, the resource determination component 402 can include and/or exclude resources based upon a user identity. As will further be described, in addition to verifying that a user is who they purport to be, this identity can also represent the current capacity and/or context of the user (e.g., work, home, personal).

As shown in FIG. 4, the resource determination component 402 communicates with the data analysis component 302 to prompt access to the desired data. The data analysis component 302 employs a retrieval component 404 to obtain, receive or otherwise access the data related to the determined resource(s) 106. As described above, the data analysis component 302 can determine a desired (e.g., based upon a preference or cost effectiveness) format. This format can be conveyed to the normalizer component 202.

In turn, the data normalizer component 202 can employ a translator component 406 to translate and thereafter convert the data into the target format (e.g., semantic and/or structure) determined by the data analysis component 302. Ultimately, the normalized (or standardized) data can be transmitted to a target resource within the cloud or external to the cloud. It is to be appreciated that data analysis and translation can be based on a wide spectrum of techniques. More particularly, analysis and/or translation can be purely syntactic, based on commonalities in the shapes of the data, purely semantical based on understanding the meaning or intent of the data, or any combination thereof including based on user preference or user input. Moreover, as will be described in greater detail infra, analysis and translation can employ machine learning and reasoning (MLR) and/or artificial intelligence (AI) mechanisms to facilitate functionality.

Figure 5:
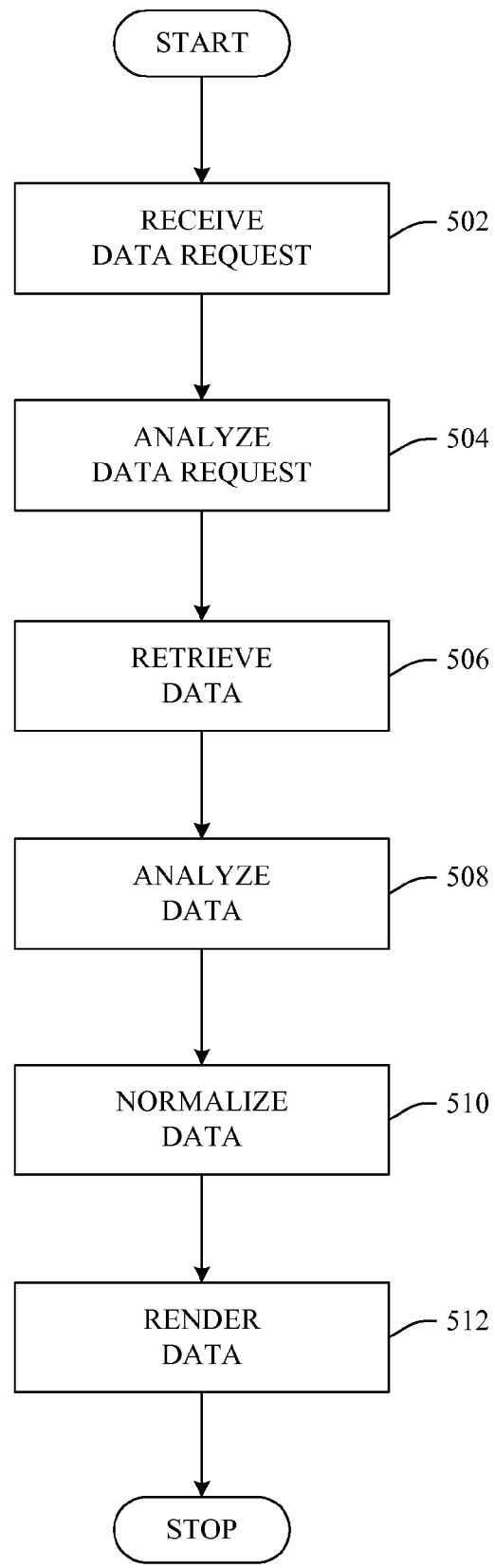
FIG. 5 illustrates an exemplary flow chart of procedures that facilitate rendering normalized data in accordance with an aspect of the innovation.

FIG. 5 illustrates a methodology of rendering normalized data in accordance with an aspect of the specification. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 502 a data request can be received from a user and/or resource. It is to be understood that this data request can be received directly from a user/client. As well, the data request can be received directly from a resource within or outside of the cloud. In either case, at 504, the data request can be analyzed. For example, as described supra, the data request can be analyzed to determine resources associated with the type of data as well as the location of those resources.

The data can be retrieved at 506. For example, the data can be retrieved from resource and/or data stores maintained within the 'cloud.' Similarly, the data can be retrieved from sources external to the cloud, as well as combinations thereof. In any scenario, the data can be analyzed at 508 in order to determine type, source, content, permissions, restrictions, policies, etc.

At 510, the data can be normalized in accordance with a determined type or source. Essentially, at 510, the data can be modified (e.g., normalized, standardized, translated, converted) into a common format recognizable and/or employable by the applicable resources (or requestor). The data can be rendered at 512. Here, the data can be rendered to a resource and thereafter provided to the user.

Figure 6:
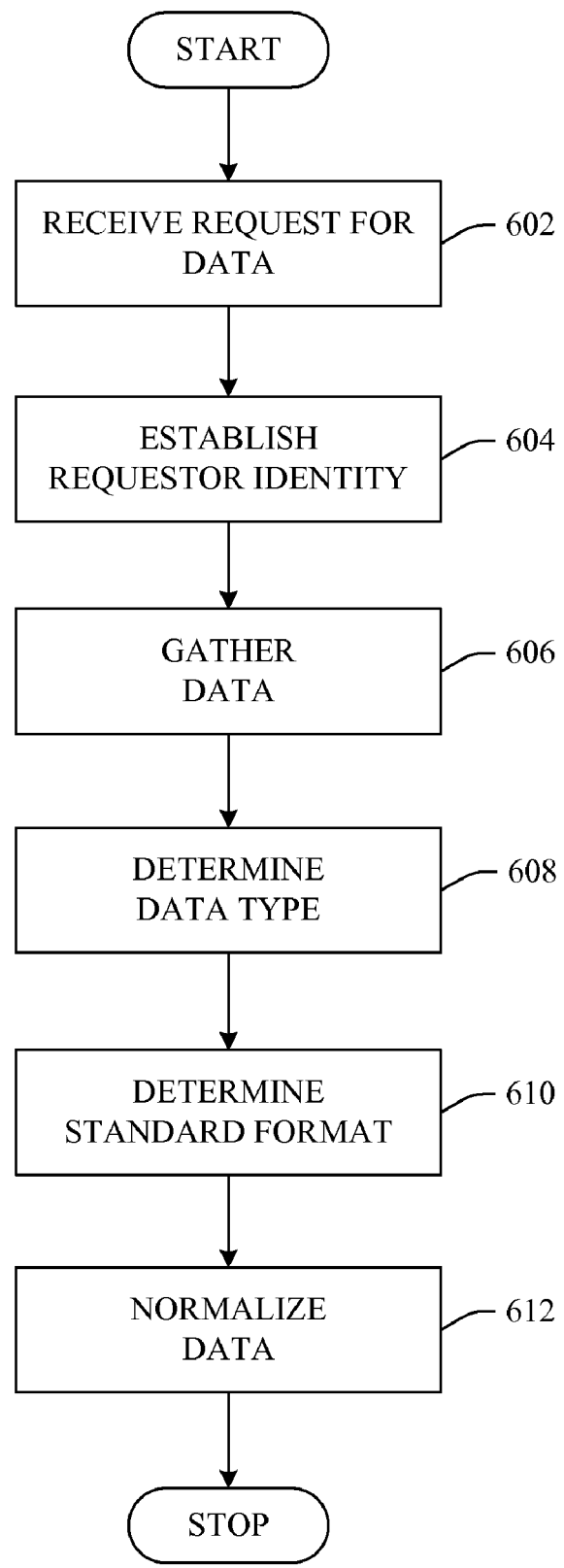
FIG. 6 illustrates an exemplary flow chart of procedures that facilitate determining a standard format and normalizing data with respect to the standardized format in accordance with an aspect of the innovation.

Referring now to FIG. 6, a methodology of rendering normalized data in accordance with a user identity is shown. At 602, a request for data can be received from a user. Accordingly, the identity of the requester can be established at 604. The identity can be established in many different ways, including but not limited to, via user name/password, challenge/response, biometrics, context analysis, device analysis, etc.

It is to be understood that identity can refer to an individual's 'actual' identity as well as specific capacity at a particular time. For instance, the system can determine that John Doe is actually John Doe by using challenge/response and biometric mechanisms. Similarly, the system can determine what capacity (e.g., home, work) John Doe is acting within by evaluating information from context analysis, device analysis, etc. This information can be used to gather data at 606.

Once the data is gathered, at 608, the gathered data can be analyzed in order to determine the type(s) of data retrieved. This information can be used at 610 in order to establish a standardized target format for the data. At 612, the data can be normalized into a common or standardized format.

Figure 7:
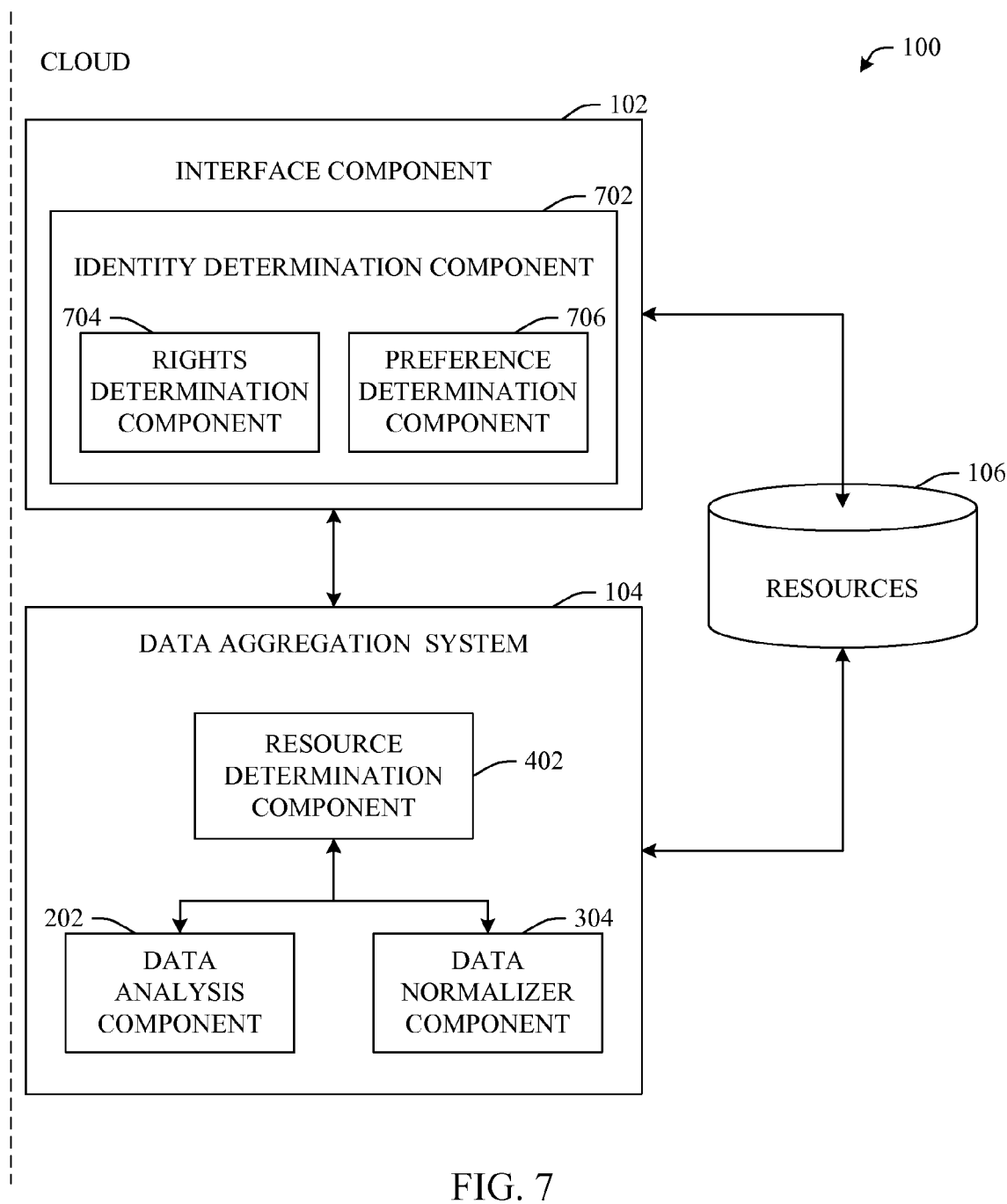
FIG. 7 illustrates a block diagram of a data aggregation system that determines a user identity and employs the identity in aggregating and normalizing data in accordance with an aspect of the innovation.

FIG. 7 illustrates yet another aspect of system 100 that facilitates normalizing data in accordance with an aspect of the innovation. Generally, system 100 can include an interface component 102 that provides a gateway between a user and one or more 'cloud-based' resources 106. In particular, the interface component 102 can include an identity determination component 702 that enables the system to determine an identity of the user. As described supra, the 'identity' can be an actual identity (e.g., the user is who they say they are) and/or an instant identity (e.g., the user is operating outside of a professional capacity, the user is in a 'manager' role of a particular organization).

It is to be understood that this identity can be employed to determine associated resources (e.g., applications, data). As shown in FIG. 7, the identity determination component 702 can include a rights determination component 704 and a preference determination component 706. In operation, these components (704, 706) can employ the established identity (e.g., actual and/or instant) in order to associate rights and/or preferences with the identity. These rights and preferences can be used to select the resources available as a function of the identity. In turn, the data aggregation system 104 can aggregate and ultimately normalize data associated to the identity-specific resources.

Although the rights determination component 704 and the preference determination component 706 are shown integral to the identity determination component 702, it is to be understood that, in other aspects, these components and their associated functionality can be external to the identity determination component 702. It is to be understood that these alternative aspects are to be included within the scope of this disclosure and claims appended hereto.

Figure 8:
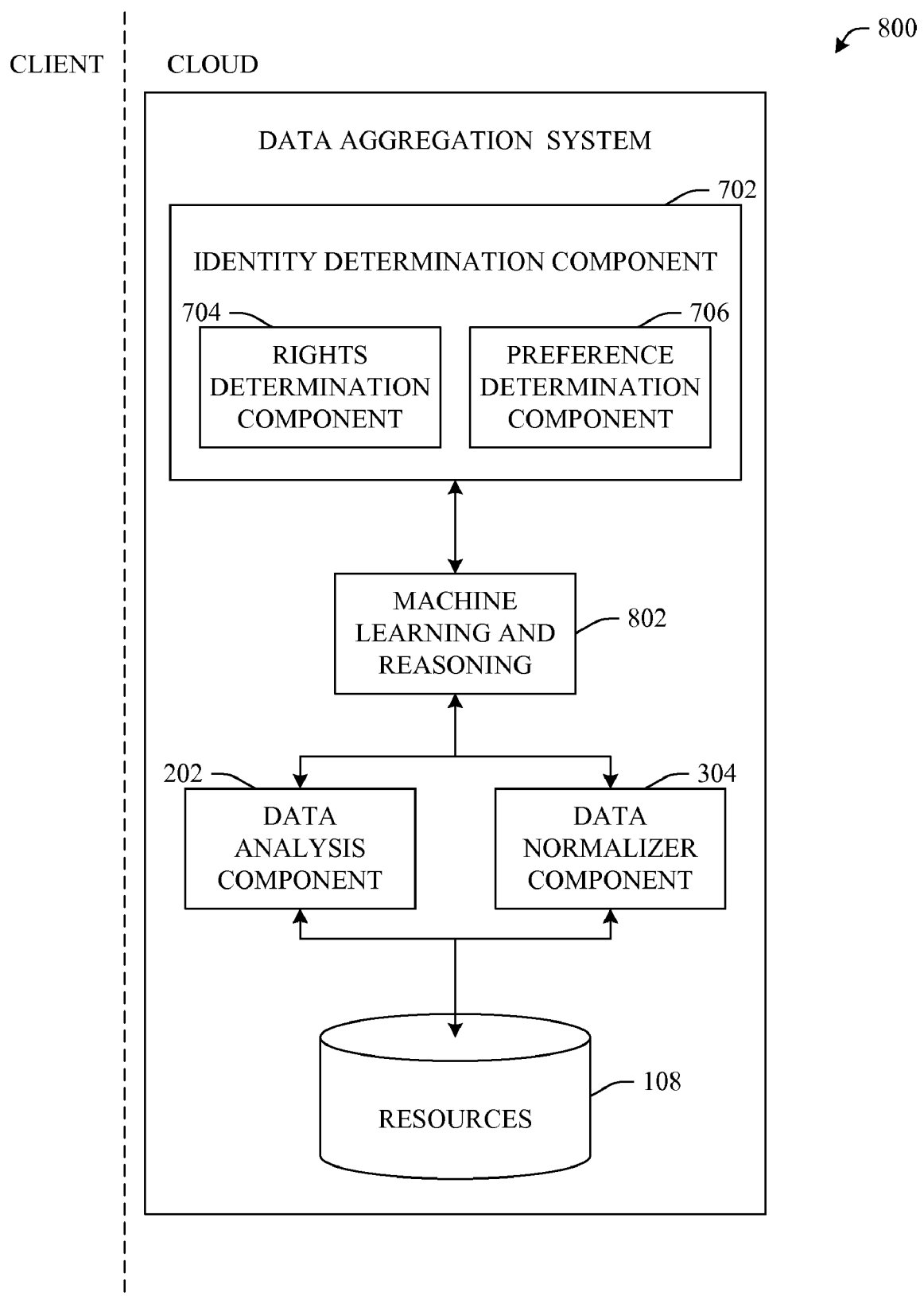
FIG. 8 illustrates a system that employs a machine learning and reasoning (MLR) component to automatically determine and/or infer on behalf of a user in accordance with an aspect of the innovation.

Moreover, it is to be understood that MLR mechanisms can be employed to automatically prognose and/or infer an action and/or determination. FIG. 8 illustrates a data aggregation system 800 that employs an AI and/or an MLR component 802 which facilitates automating one or more features in accordance with the subject innovation.

The subject innovation (e.g., in connection with resource selection, normalization) can employ various AI-based schemes for carrying out various aspects thereof. For example, a process for determining which resources to access, with resources to aggregate, which format to choose for standardization, etc. can be facilitated via an automatic classifier system and process.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria which resources to access, which rights should be granted, what preference(s) to apply, which format to choose for normalization, etc.

Figure 9:
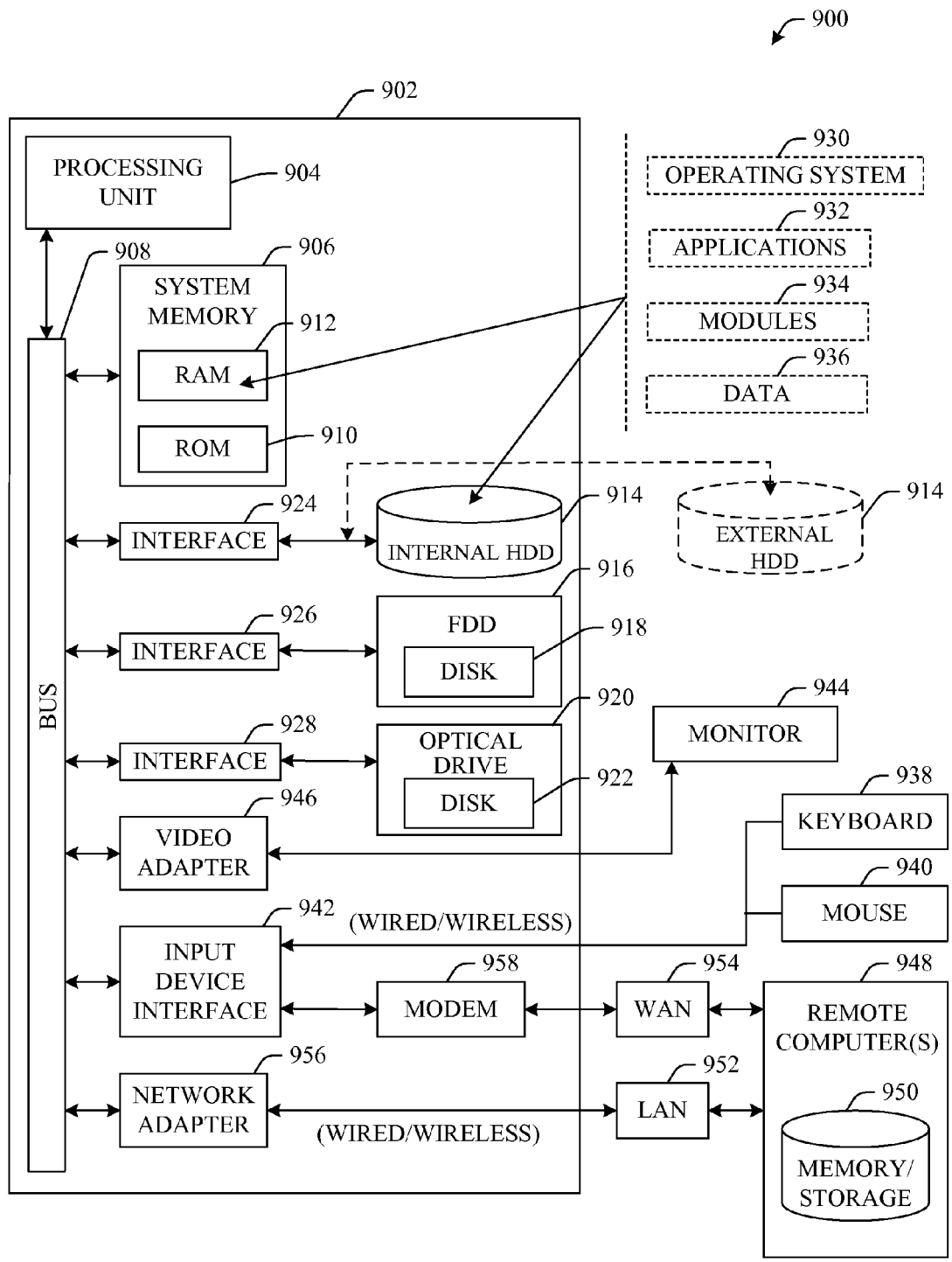
FIG. 9 illustrates a block diagram of a computer operable to execute the disclosed architecture.

Referring now to FIG. 9, there is illustrated a block diagram of a computer operable to execute the disclosed architecture. In order to provide additional context for various aspects of the subject innovation, FIG. 9 and the following discussion are intended to provide a brief, general description of a suitable computing environment 900 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects of the innovation includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM)

912. A basic input/output system (BIOS) is stored in a nonvolatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the innovation can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adapter 956 may facilitate wired or wireless communication to the LAN 952, which may also include a wireless access point disposed thereon for communicating with the wireless adapter 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
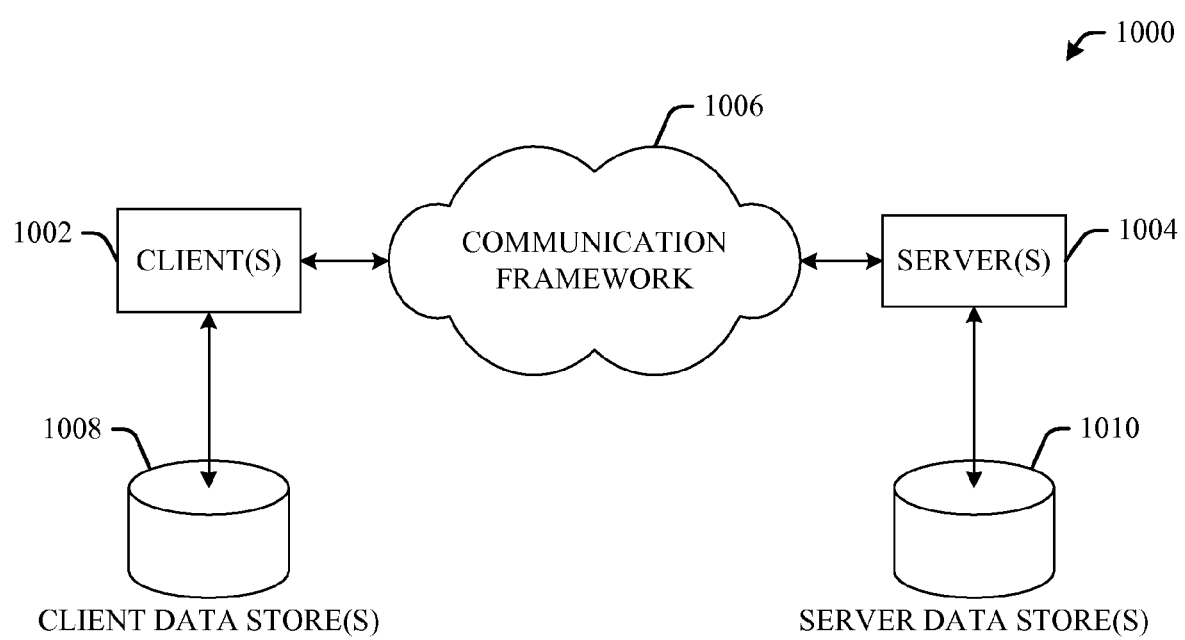
FIG. 10 illustrates a schematic block diagram of an exemplary computing environment in accordance with the subject innovation.

Referring now to FIG. 10, there is illustrated a schematic block diagram of an exemplary computing environment 1000 in accordance with the subject innovation. The system 1000 includes one or more client(s) 1002. The client(s) 1002 can be hardware and/or software (e.g., threads, processes, computing devices). The client(s) 1002 can house cookie(s) and/or associated contextual information by employing the innovation, for example.

The system 1000 also includes one or more server(s) 1004. The server(s) 1004 can also be hardware and/or software (e.g., threads, processes, computing devices). The servers 1004 can house threads to perform transformations by employing the innovation, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates data management, comprising:
    a processor;
    one or more computer-readable storage media storing one or more components configured for execution by the processor, the components comprising:
        an interface component that receives a request for data;
        a data aggregation component that retrieves the data from an off-premise source comprising a plurality of disparate resources, each disparate resource operating according to a specific protocol and format tailored to a specific purpose;
        a data normalizer component that translates semantics and structure of the data into a common format that is compatible across the plurality of disparate resources;
        a data analysis component that evaluates the data and determines the common format based at least on a cost analysis; and
        a machine learning and reasoning component that utilizes an automatic classifier process employing a probabilistic and statistical-based analysis to infer an action that a user desires to be automatically performed by the data aggregation component and the data normalizer component.

2. The system of claim 1, wherein the interface component authenticates an identity of a requestor of the data and regulates access to the data as a function of the authentication.

3. The system of claim 2, wherein the interface component comprises an identity component that establishes the identity of the requestor.

4. The system of claim 2, wherein the interface component enables an access control list (ACL) to be configured, wherein the ACL controls access to the data as a function of the identity of the requestor.

5. The system of claim 1, wherein the data normalizer component is extensible to enable normalization into a plurality of target formats.

6. The system of claim 1, wherein the interface component enables installation of a plug-in that extends normalization capabilities as a function of disparate target formats.

7. The system of claim 1, wherein the data analysis component further evaluates the data and determines at least one of a type, size, content and context associated with the data, wherein the data normalizer component normalizes the data as a function of the at least one of type, size, content and context.

8. The system of claim 1, wherein the data analysis component further employs context to determine a target format for the data.

9. The system of claim 1, wherein the data aggregation component acquires data from a local resource, and the data is compatible with both off-premise and on-premise resources.

10. A computer-implemented method of standardizing data, comprising:
    receiving a data request from a requestor;
    authenticating identity of the requestor;
    utilizing an automatic classifier process employing a probabilistic and statistical-based analysis to infer an action, associated with the data request, that the requestor desires to be automatically performed;
    retrieving data from an on-premise or off-premise source as a function of the data request, the on-premise or off-premise source comprising a plurality of disparate resources, each disparate resource operating according to a specific protocol and format tailored to a specific purpose;
    determining a standard format common to the plurality of disparate resources retrieved based at least on a cost analysis; and
    normalizing the data in accordance with the standard format.

11. The computer-implemented method of claim 10, further comprising de-normalizing the data in accordance with a disparate target format.

12. The computer-implemented method of claim 10, further comprising filtering the data based at least on the identity of the requestor.

13. One or more computer-readable storage media storing computer executable instructions that, when executed by one or more processors, configure a computing device to perform a method facilitating standardization of data, the method comprising:
    determining a requestor associated with a data request;
    authenticating an identity of the requestor;
    utilizing an automatic classifier process employing a probabilistic and statistical-based analysis to infer an action, associated with the data request, that the requestor desires to be automatically performed;
    retrieving data that corresponds to the data request from a plurality of resources, each resource operating according to a specific protocol and format tailored to a specific purpose;
    determining a standard format common to the plurality of resources retrieved based at least on a cost analysis; and
    standardizing the data in accordance with the standard format.

14. The one or more computer-readable storage media of claim 13, wherein the standardizing employs a result of the authentication to allow or deny standardization as a function of a policy established by an owner of the data.

15. The system of claim 1, wherein the data analysis component further evaluates the data and determines the common format based at least on one of a compatibility analysis, a user preference, a user context and a device profile.

16. The computer-implemented method of claim 10, wherein the standard format is further based on one of a compatibility analysis, a user preference, a user context and a device profile.

* * * * *

UNITED STATES PATENT AND TRADEMARK OFFICE
CERTIFICATE OF CORRECTION

PATENT NO.        : 7,797,453 B2
APPLICATION NO.   : 11/613342
DATED             : September 14, 2010
INVENTOR(S)       : Henricus Johannes Maria Meijer et al.

Page 1 of 1

It is certified that error appears in the above-identified patent and that said Letters Patent is hereby corrected as shown below:

In column 15, line 3, in Claim 14, delete "authentication" and insert -- authenticating --, therefor.

Signed and Sealed this
Third Day of May, 2011

David J. Kappos
*Director of the United States Patent and Trademark Office*